(12) United States Patent  
Shia et al.

(10) Patent No.: US 8,723,823 B2
(45) Date of Patent: May 13, 2014

(54) SYSTEM AND METHOD FOR PROVIDING NOTIFICATIONS ON A MOBILE COMPUTING DEVICE

(75) Inventors: Megan Shia, San Francisco, CA (US); Le Chen, Mountain View, CA (US); Chadwyck Wirtz, Sunnyvale, CA (US); Samuel Hoang, Seattle, WA (US); Eric Hsieh, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 214 days.

(21) Appl. No.: 13/172,026

(22) Filed: Jun. 29, 2011

(65) Prior Publication Data

US 2012/0204191 A1  Aug. 9, 2012

Related U.S. Application Data

(60) Provisional application No. 61/440,347, filed on Feb. 7, 2011.

(51) Int. Cl.
*G06F 3/041* (2006.01)

(52) U.S. Cl.
USPC .......................................... 345/173; 715/701

(58) Field of Classification Search
USPC ............................................ 345/173; 715/701
See application file for complete search history.

(56) References Cited

U.S. PATENT DOCUMENTS

| | | | |
|---|---|---|---|
| 8,228,300 B2* | 7/2012 | Lundy et al. ................. | 345/173 |
| 2005/0020316 A1* | 1/2005 | Mahini ......................... | 455/566 |
| 2009/0201270 A1* | 8/2009 | Pikkujamsa et al. ......... | 345/184 |
| 2009/0249247 A1* | 10/2009 | Tseng et al. .................. | 715/808 |
| 2011/0004845 A1* | 1/2011 | Ciabarra ........................ | 715/808 |

\* cited by examiner

*Primary Examiner* — Andy Ho
(74) *Attorney, Agent, or Firm* — Mahamedi Paradice Kreisman LLP

(57) ABSTRACT

A system and method for providing notifications on a mobile computing device is disclosed. The method comprises enabling multiple applications that operate on the mobile computing device to generate notifications in response to event occurrences. A plurality of notification representations are presented in a notification bar on the display. The plurality of notification representations are individually generated by a corresponding application in response to an event occurrence. The plurality of notification representations are represented in a first portion of the notification bar and with a number that represents how many notification representations from an application have been generated and not dismissed by a user.

20 Claims, 6 Drawing Sheets

US 8,723,823 B2

SYSTEM AND METHOD FOR PROVIDING NOTIFICATIONS ON A MOBILE COMPUTING DEVICE

RELATED APPLICATIONS

This application claims the benefit of priority under 35 U.S.C. 119(e) to Provisional Application Ser. No. 61/440,347, filed Feb. 7, 2011, titled SYSTEM AND METHOD FOR PROVIDING NOTIFICATIONS ON A MOBILE COMPUTING DEVICE, which is incorporated herein by reference in its entirety.

BACKGROUND OF THE INVENTION

Mobile computing devices are used for a variety of different purposes. For example, a user can use a mobile computing device to read and send emails, receive or send text messages, receive or make phone calls, schedule appointments, or to perform other tasks. Whether a user is currently using the mobile computing device or not, it is important to notify the user of various events that occur.

With the increase of functionalities and various applications that are provided on mobile computing devices, an efficient way to receive and/or view notifications is needed.

BRIEF DESCRIPTION OF THE DRAWINGS

The disclosure herein is illustrated by way of example, and not by way of limitation, in the figures of the accompanying drawings and in which like reference numerals refer to similar elements, and in which.

DETAILED DESCRIPTION

Figure 1:
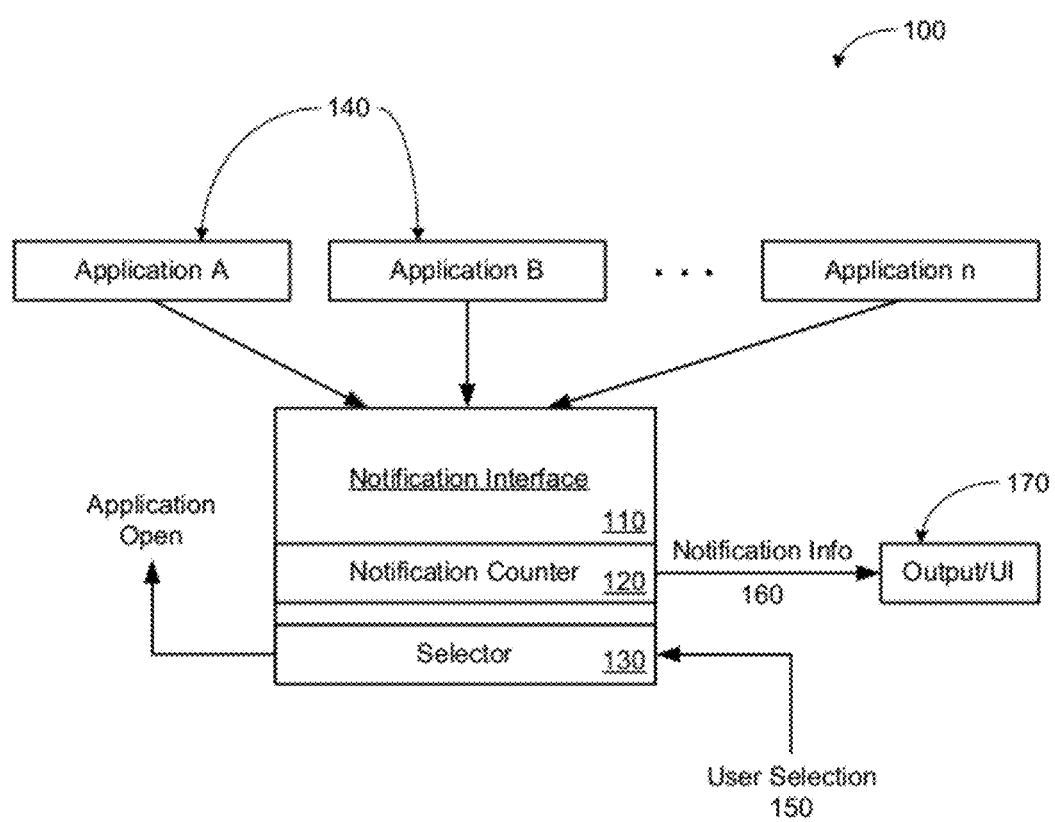
FIG. 1 illustrates a system for providing notifications on a mobile computing device under an embodiment.

Embodiments described herein include a system and method for displaying representations of notifications in grouped form, and in a manner that enables represented notifications to be individually acted on by the user. More specifically, embodiments enable a user to respond to individual notifications through use of a user-interface that interactively displays representations of such notifications in groups and by application.

According to embodiments, applications that operate on a computing device generate notifications that are responsive to event occurrences. The occurrence of such notifications is represented by interactive graphic features that are termed notification representations. Notification representations may be generated to be responsive to user input, and more specifically, responsive to touch or other forms of contact input which a user may make onto a display medium on which notification representations are provided.

Over the course of a duration, embodiments recognize that individual applications may generate multiple notifications. Under embodiments described, multiple notifications may be represented by a group notification representation, which further enables individual notification representations that comprise the group to be identified and acted upon in an interactive manner. The grouped notification representation, as well as the notification representations that comprise the group, may be displayed in the panel or region of a larger display, and made interactive to user input, independent of whether the application that generated the underlying notifications is launched.

According to some embodiments, a notification bar is used to display notification representations individually, and in group form. If multiple applications generate notifications, the notification bar may be segmented for the individual applications, with group form notification representations being enabled for one or more portions of the notification bar.

In one embodiment, group notification representations may include quantified expressions that indicate a number of notifications that underlined the representation. For example, according to some embodiments, the group notification representation may display a number that identifies the number of notifications represented by the grouped notification representations. A user may act on the grouped notification representation to view individual notification representations that comprise the group. Furthermore, the user may act on the individual notification representations when made available through user interaction. In particular, the user may dismiss or discard a notification representation from the grouped representation. The result is that the number represented by the group notification representation is decremented. In this way, some embodiments provide that the number displayed in the grouped notification representation identifies a number of notification representations that the user has not seen, or alternatively, not acted upon. With reference to the foregoing, the user interaction with the notification representations may occur without any user activity to the application that generated the underlying notifications.

According to some embodiments, a grouped notification representation displays a number that corresponds to notifications generated from an application, in response to event occurrences that are recognized by that application. The number can be adjusted in response to a user's input or action that dismissed at least one of the multiple notification representations.

In some variations, portions of the notification bar that are dedicated to notification representations from a particular application can be removed from the notification bar when the count of unseen, or not acted upon notifications become zero. Still further, the number portion of the portion of the notification bar may be illuminated when the count of unseen, or not acted upon notification representations is one (e.g. the single notification representation may be generated as a sub bar and the notification bar).

In the various embodiments described, the user may also be able to affect the notification representations in the notification bar by operating the application from which the underlying notifications were generated. For example, if the underlying notifications represent unread e-mails, and the user opens the e-mail application to view e-mails, the notification representations in the notification bar may be updated by the user's actions to open and view e-mails. Such actions may thus decrement, or eliminate the notification bar (or the portion of the notification bar) dedicated to the particular application, without the user actually interacting with the notification bar or portion thereof.

In some cases, the notification bars may also be modified (e.g. the notification number of the notification bar may be decremented) programmatically by the underlying application, or some other programmatic element. For example, with e-mail notifications, the notification number of the notification bar may be decremented, or the notification bar or portion thereof may be eliminated, in response to the user viewing the e-mails on a separate machine or through a web interface.

In one or more embodiments, the plurality of notification representations that can be presented in the notification bar also includes notification representations generated by a second common application in a second portion of the notification bar and with a second number or expression of quantity.

According to other embodiments, a notification bar may be segmented into multiple portions, each of which represents a notification sub-bar. Each individual portion can represent a notification that was generated by the first common application in response to an event occurrence. The individual potions can be visually stacked on top of one another in order to form the notification bar.

In some embodiments, each portion that corresponds to a common application, can have group notification representations corresponding to multiple notifications generated by the common application. The group notification representations can be presented as multiple layers of each notification representation. The top layer can represent the most recent notification generated by the first common application. In other embodiments, the top layer can represent the oldest notification generated by the first common application.

According to some embodiments, a user's inputs or actions can be performed by a user's touch on the touch screen display. A swiping gesture or other touches or taps on the screen display can be made by a user to provide input to the mobile computing device. Other inputs can include a quick double tap, or a tap, hold and drag.

One or more embodiments described herein provide that methods, techniques and actions performed by a computing device are performed programmatically, or as a computer-implemented method. Programmatically means through the use of code, or computer-executable instructions. A programmatically performed step may or may not be automatic.

Some embodiments described herein may be implemented using programmatic elements, often referred to as modules or components, although other names may be used. Such programmatic elements may include a program, a subroutine, a portion of a program, or a software component or a hardware component capable of performing one or more stated tasks or functions. As used herein, a module or component, can exist on a hardware component independently of other modules/components or a module/component can be a shared element or process of other modules/components, programs or machines. A module or component may reside on one machine, such as on a client or on a server, or a module/component may be distributed amongst multiple machines, such as on multiple clients or server machines. Any system described may be implemented in whole or in part on a server, or as part of a network service. Alternatively, a system such as described herein may be implemented on a local computer or terminal, in whole or in part. In either case, implementation of system provided for in this application may require use of memory, processors and network resources, including data ports, and signal lines (optical, electrical etc.), unless stated otherwise.

Some embodiments described herein may generally require the use of computers, including processing and memory resources. For example, systems described herein may be implemented on a server or network service. Such servers may connect and be used by users over networks such as the Internet, or by a combination of networks, such as cellular networks and the Internet. Alternatively, one or more embodiments described herein may be implemented locally, in whole or in part, on computing machines such as desktops, cellular phones, personal digital assistances, laptop computers, or other computing devices. Thus, memory, processing and network resources may all be used in connection with the establishment, use or performance of any embodiment described herein (including with the performance of any method or with the implementation of any system).

Furthermore, some embodiments described herein may be implemented through the use of instructions that are executable by one or more processors. These instructions may be carried on a computer-readable medium. Machines shown in figures below provide examples of processing resources and computer-readable mediums on which instructions for implementing embodiments of the invention can be carried and/or executed. In particular, the numerous machines shown with embodiments of the invention include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on many cell phones and personal digital assistants (PDAs)), and magnetic memory. Computers, terminals, network enabled devices (e.g. mobile devices such as cell phones) are all examples of machines and devices that utilize processors, memory, and instructions stored on computer-readable mediums. Additionally, embodiments may be implemented in the form of computer-programs, or a computer usable carrier medium capable of carrying such a program.

Overview

FIG. 1 illustrates a system for providing notifications on a computing device under an embodiment. A system such as illustrated with FIG. 1 may be implemented on, for example, a computing device, although embodiments may be implemented on numerous other computing form factors. In an embodiment, system 100 provides notification representations on a display of a computing device to enable or assist a user to easily determine and access events that occurs with a variety of different applications. The notification representations are represented as groups and are separated in a way to enable a user to easily distinguish the corresponding applications for the notification representations. The user can dismiss the notification representations or read a plurality of records that each correspond to the notification representations quickly and efficiently.

As examples, the computing device may correspond to any device that includes roaming wireless network and/or telephony capabilities, including cellular telephony devices and/or mobile messengers. In particular, embodiments described herein may apply to numerous kinds of mobile or small form-factor computing devices. Some types of mobile computing devices that may be configured to include embodiments described herein includes a computer telephony device, such as a cellular phone or mobile device with voice-telephony applications (sometimes called "smart phone") or a tablet device. A computing device such as described may be small enough to fit or carry in one hand, while providing cellular telephony features in combination with other applications, such as messaging, web browsing, media playback, personal information management (e.g., such as contact records management, calendar applications, tasks lists), image or video/media capture and other functionality. Computing devices in particular may have numerous types of input mechanisms and user-interface features, such as keyboards or keypads, mufti-directional or navigation buttons, application or action buttons, and contact or touch-sensitive display screens. Some devices may include combinations of keyboard, button panel area, and display screen on one façade. The button panel region may occupy a band between the keypad and the display area, and include a navigation button and multiple application buttons or action buttons.

Specific types of messaging that may be performed include messaging for email applications, Short Message Service (SMS) messages, Multimedia Message Service (MMS) messages, and proprietary voice exchange applications (such as SKYPE). Still further, other types of computing devices contemplated with embodiments described herein include laptop or notebook computers, ultra-mobile computers, personal digital assistants, and other multi-functional computing devices or mobile/portable devices.

Still further, one or more embodiments may be implemented through any type of computing device such as a desktop computer that is configured to include real-time voice data exchange (e.g. through use of Internet Protocol telephony). Still further, other types of computer telephony devices exist, including standalone devices that connect directly to a telephone network (whether Internet Protocol or Public Switch Telephony System (PSTN)) and provide software interfaces and applications.

According to an embodiment, the system 100 comprises a notification interface 110. The notification interface 110 includes a notification counter module 120 and a selector module 130. The notification interface 100 communicates with a plurality of applications 140 and an output/user interface (UI) module 170 to provide notification representations on a display of the computing device. The plurality of applications 140 generates notifications in response to event occurrences and communicates them to the notification interface 110.

The plurality of applications 140 can include applications such as messaging (e.g., SMS, MMS, instant messages, or other types), web browsing, media playback, personal information management (e.g., such as contact records management, calendar applications, tasks scheduling and lists), image or video/media capture and other applications providing various other functionalities. Depending on event occurrences with respect to various applications, each of the plurality of applications 140 can generate notifications and communicate them to the notification interface 110.

For example, a user can connect the user's computing device with a number of different email accounts. Throughout a given day, a user can receive dozens of emails from other users or other parties. Each time the user receives a new email (e.g., an event occurrence), the email application can generate a notification in response to the event occurring and communicate the notification to the notification interface 110. Similarly, a second application, for example, can be a messaging application that can generate a notification in response to a user receiving a text message or instant message from another user. The second application can also communicate the notification to the notification interface 110. Other event occurrences for various applications can be an alarm clock notification, an upcoming event on a calendar, upcoming items on a task list that are due, notifications from social networking websites (e.g., a new friend request or wall post on FACEBOOK.COM), missed calls, voicemails, or other events. Depending on the notifications received from the applications 140, the notification interface 110 can cause the output/UI module 170 to provide a notification bar with notification representations.

The output/UI module 170 is configured to provide a notification bar on the display of the computing device. The notification bar can include a plurality of notification representations for a variety of applications. Each notification representation corresponds to a notification generated by an application in response to an event occurrence. In some embodiments, a first portion of the notification bar can correspond to a first application and a second portion of the notification bar can correspond to a second application so that the notification representations are provided on the different portions depending on the application. The output/UI module 170 receives notification information 160 from the notification interface 110. The notification information 160 can include data about notifications generated by one or more of the plurality of applications 140, data corresponding to user input to update the notification representations on the notification bar, and data corresponding to a counter.

According to an embodiment, the output/UI module 170 can use the notification information 160 received from the notification interface 110 to provide and update the notification bar on the display. Because various applications 140 continue to generate notifications in response to event occurrences, the notification interface 110 can continue to send new notification information 160 to the output/UI module 170. In some embodiments, the notification bar can be a part of or be included in a status bar or tool bar on the display. The status bar or tool bar can be displayed on the home screen or default screen of the computing device. In other embodiments, the notification bar can appear (like a drop down or pop up menu bar, for example) when a user selects a notification icon or icons from the status bar or tool bar and can disappear or be hidden if a user is not viewing or using the notification bar (or after a predetermined period of time).

The notification interface 110 maintains information regarding the various notifications generated and received by the plurality of applications 140. In one embodiment, the notification counter 120 maintains a counter for each of the plurality of applications 140. Application A has a first counter associated with it, Application B has a second counter associated with it, and so on. The number of the counter for each application represents the number of notifications that have been generated by a particular application and not dismissed by a user. In some embodiments, a user can dismiss a notification by either launching the corresponding application to view or render a record corresponding to the notification, or by dismissing it with a user action. The user can dismiss one or more notification representations depending on the user's action or selection 150.

The selector module 130 receives user selections 150 or inputs from a user. Depending on the user selection 150, the user selection 150 can affect the notification information 160. A user selection 150 can be a variety of different inputs by a user. In some embodiments, for example, a user can individually launch one or more applications and view one or more records that correspond to one or more notification representations. The user may also select a notification representation from the notification bar to launch the particular application and view the corresponding record for the selected notification representation. The user may also dismiss one or more notification representations of a first application from the notification bar or dismiss all of the notification representations of the first application depending on the user's action. In other embodiments, the user may dismiss all the notification representations of all the applications. The user may also do nothing and provide no input that affects the notification information 160. The selector module 130 determines the user selection 150 and communicates with the notification counter module 120 to adjust the counter for a particular application or not. Updated notification information 160 can be sent to the output/UI module 170 so that the output/UI module 170 can provide updated notification bars on the display.

For example, if a user received three new emails during a period of time from other users or parties and did not read or view the emails, the notification counter module 120 would maintain a counter for the email application with the number three. The selector module 130 would determine that there was no user selection 150 and communicate the information to the notification counter module 120. Three notification representations on the notification bar would be provided, with each notification representation corresponding to each of the three emails.

If, however, the user had launched the email application (e.g., made a user selection 150) and viewed an email corresponding to a particular email notification representation (e.g., the second email received), or had dismissed an email notification representation from the notification bar through a user selection 150 or input, the selector module 120 would communicate that information to the notification counter module 120. The notification counter module 120 can adjust the counter for the email application to two, instead of three, and the notification interface 110 can send the new notification information 160 to the output/UI module 170. The output/UI module 170 can provide a notification bar that shows two email notification representations in a first portion of the notification bar along with a graphic representation of the email application. In one embodiment, the first portion of the notification bar can also include the number two with the graphic representation, which represents how many email notifications have been generated by the email application and not dismissed by the user.

In some embodiments, the notification representations are presented in the notification bar with text and/or a graphic image to assist a user to quickly determine what the notification representation is about. Because a notification bar can be small in size, the notification representations must be able to display sufficient information about the notification in a small amount of space. Depending on the application, the content of the notification representations can vary. For example, for a missed call, the notification representation can have a phone number with the text that says "Missed Call" and/or the time in which the missed call occurred. If a user receives a text message, the notification representation can show the phone number and/or the name of the user who sent the text message along with a short text from the body of the text message (e.g., the first few words of the text message, or key words). For a new received email, the notification representation can display the name or email address of the sender along with a short text from the subject of the email or from the body of the email.

The notification representations are grouped together according to their corresponding applications. For calendar events, the notification representations showing upcoming events (upcoming the day of or within a specified time period) will be grouped together in a portion of the notification bar. Email notifications will be grouped together in another portion, while text messages are grouped together in another different portion, etc. In some embodiments, the notification representations are configured and displayed as layers. If there are four text messages that have been received and not dismissed by the user, four notification representations are stacked on top of each other in one portion of the notification bar. In one or more embodiments, the top layer can represent the most recently generated notification (e.g., the most recently received text message). In other embodiments, the top layer can represent the oldest generated notification and not dismissed by a user (e.g., the oldest text message received and not dismissed by the user).

The user can dismiss the notification representation on the top layer, for example, by a user action or selection 150. In some embodiments, the user can hold and swipe/drag the layer in one or more directions to dismiss the notification representation without actually viewing or launching the corresponding application. The user can also read or view the record corresponding to the notification representation on the top layer by selecting the notification representation. Upon the user selection 150, the corresponding application with the specific record can be automatically launched or opened. In other embodiments, the user can dismiss the entire notification set of the application through a user action.

For example, if there are four text messages that have been received and not dismissed by the user, four notification representations are stacked on top of each other in one portion of the notification bar. The counter is set at four and the number "4" is displayed with the portion of the notification bar. The user may dismiss the top notification representation by removing the layer with a swiping gesture in one or more directions (e.g., swipe to the right away from the graphic image of the text message, for example). The counter is decremented to three and the number "3" is displayed with the portion of the notification bar. The user may also dismiss the entire grouped notification representations that is provided on the portion of the notification bar through user action. Examples of the swiping gesture are discussed with reference to FIGS. 4-6 below.

In one or more embodiments, when an application generates a notification in response to an event occurrence, the notification bar presents the corresponding notification representation along with a graphic image that corresponds to the application. For example, for an email notification representation on the notification bar, the notification bar can also present a small graphic image of an envelope to represent the email application. The graphic image of the envelope can also have a number representing the counter for the email application if there are more than one notification representations for the email application. Examples of the graphic image are discussed with reference to FIGS. 4-6 below.

Figure 2:
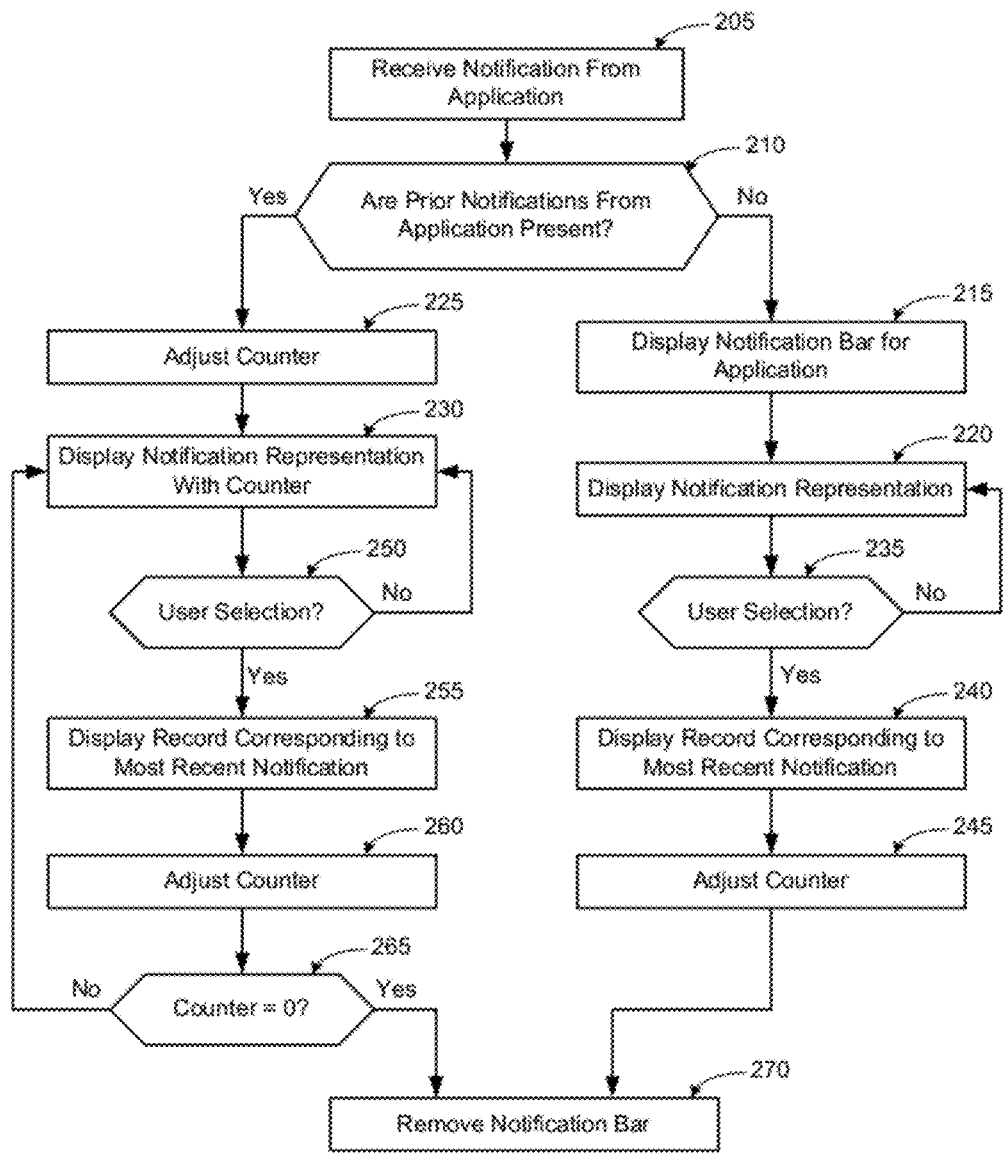
FIG. 2 illustrates a method for providing notifications on a mobile computing device, according to an embodiment.

FIG. 2. illustrates a method for providing notifications on a computing device, according to an embodiment. A method such as described with FIG. 2 may be implemented using, for example, elements shown and described with FIG. 1. As such, references to elements of FIG. 1 are intended to illustrate only suitable elements for performing a step or sub-step being described.

In one embodiment, the flow chart of FIG. 2 represents an exemplary method in which notifications are provided on a computing device. In step 205, a notification is received from an application. The notification is generated by an application in response to an event occurrence. As discussed, an event occurrence can vary depending on the different types of applications. The event occurrence can be a new email received, a new text message received, an alarm clock notification, an upcoming event on a calendar, upcoming items on a task list that are due, notifications from social networking websites (e.g., a new friend request or wall post on FACEBOOK.COM or a new TWEET or comment on an online account), missed calls, voicemails, or other events. Notifications can be received by the notification interface 110 from multiple applications 140.

At step 210, the notification interface 110 determines whether there are prior notifications from the application present. For example, if the received notification is generated by a messaging application, the notification interface 110 determines whether there are prior messaging application notifications present and not dismissed by the user previously. A messaging application notification can be generated in response to a user receiving a new SMS or MMS text message, or a new instant message.

If the notification received is the first notification (i.e., no other prior notifications from the corresponding application are present), then a notification bar is provided on the display (step 215). The counter associated with the messaging application is also set to one. The number represents how many notification representations have been generated and not dismissed by the user (e.g., no prior notifications are present and one notification has been received). For example, if the notification generated by the messaging application is in response to a receiving a SMS text message from a friend, the notification representation corresponding to that event is displayed on the notification bar. The notification interface 110 communicates the variety of different notification information (e.g., that the received notification is the first notification received from the messaging application and has not been dismissed) to the output/UI module 170 so that the output/UI module 170 can provide a notification bar on the display of the computing device. The displayed notification bar presents a notification representation corresponding to the received notification (step 220). In some embodiments, the notification representation can have a graphic image corresponding to the messaging application (e.g., an icon showing a text bubble) along with text describing the notification (e.g., text showing the sender or the phone number, and text from a portion of the message).

At step 235, the selector module 130 determines whether there is user selection and what type of selection has been made. If there is no user selection (i.e., the user does not perform any action on the notification bar and does not open the messaging application), the notification bar is not changed or updated. The notification bar still presents the notification representation that corresponds to the notification that a friend had shared a link with the user. On the other hand, if a user selection is made, the selector module 130 determines what the user selection is and communicates with the notification counter 120 and the notification interface 110. As discussed, on a computing device with a touch screen, the user selection can vary depending on the type of contact with the screen (e.g., tap, double tap, swipe, drag, or other gestures). When there is only one notification representation presented on the notification bar, the user can either do nothing, independently launch or open a corresponding application to view or read the record corresponding to the notification, select the notification representation to automatically launch or open the corresponding application to view or read the record corresponding to the notification, or dismiss the notification representation without launching or opening the application.

In one embodiment, if there is a user selection to independently launch or open the corresponding application (e.g., launch or open the messaging application) to view or read the record corresponding to the notification or a user selection to select the notification representation to automatically launch or open the application to view or read the record, the record can be displayed on the computing device as part of the application (step 240). One the record corresponding to the notification representation is viewed or read, the notification representation is treated as if it has been dismissed. The counter, which was set at one after receiving the notification from the messaging application, is adjusted to zero (step 245).

After the user makes a selection to view or read the record that corresponds to the notification representation (e.g., the user is able to read the text message), there are no more notification representations for the messaging application to be presented on the notification bar. The counter is adjusted to zero, which represents that there are no more notification representations that are generated and not dismissed. At step 270, the portion of the notification bar for the presenting the messaging application is removed or hidden.

Referring back to step 210, if prior notifications for the corresponding application are present and not dismissed by a user, the notification bar is updated to present a notification representation corresponding to the received notification. In some embodiments, the notification bar is already displayed showing the prior notification representations in a portion of the notification bar. A counter is maintained by the notification counter module 120 to keep track of the number of notifications that are generated by a corresponding application and not dismissed by a user. The notification counter module 120 adjusts the counter for the messaging application according to the number of messaging notifications have been generated by the messaging application and not dismissed by the user (step 225). For example, if there are two prior messaging application notifications present and not dismissed, the counter will be adjusted to three after receiving the recent notification from the messaging application.

In step 230, the notification representations that correspond to the recently received notification and the prior notifications (which have not been dismissed by the user) are presented on the notification bar. As discussed, in some embodiments, the multiple notification representations can be represented by layers in a portion of the notification bar. The most recently received notifications can be on the top layer, with the two prior messaging application notifications stacked underneath the top layer. In other embodiments, the top layer notification representation can represent the oldest notification generated by an application and not dismissed by a user. The notification representation can also be displayed with a number that represents the counter. A user can quickly glance at the graphic image representing the messaging application with the number (e.g., "3") to determine how many messaging notifications are available and have not been read or dismissed by the user.

Similar to step 235, at step 250, the selector module 130 determines whether there is user selection and what type of selection has been made. If there is no user selection (i.e., the user does not perform any action on the notification bar and does not open the messaging application), the notification bar is not changed or updated. The notification representations are still displayed in a portion of the notification bar. The top layer notification representation, for example, can still display information that shows that a friend had shared a link with the user. On the other hand, if there is a user selection made, the selector module 130 determines what the user selection is and communicates with the notification counter 120 and the notification interface 110. Because there are multiple notification representations presented on the notification bar corresponding to the messaging application, there are a variety of different user selections or actions that the user can make.

The user can independently launch or open the messaging application to view or read the records corresponding to the notification representations. The user can also select the top layer notification representation to automatically launch or open the messaging application to view or read the record corresponding to that notification representation. The user can also dismiss one or more notification representations without launching or opening the application with a user input. In some embodiments, the user can hold and swipe/ drag a layer in one or more directions to dismiss the notification representation without actually viewing or launching the corresponding application. The user may also hold the graphic image representing the grouped notification representations and swipe/drag the entire group of layers to dismiss the all the notification representations corresponding to the graphic image.

If a user selection is made to read or view one or more records corresponding to a notification representation, the record can be displayed on the computing device with or as part of the application (step 250). In some embodiments, once the records corresponding to one or more notification representations are viewed or read, the corresponding notification representations are treated as being dismissed. At step 260 the counter is adjusted (e.g., decremented because one or more of the notification representations have been dismissed) to represent how many notification representations have been generated and not dismissed by the user. The notification representation can also be displayed on the notification bar with a number that represents the counter.

At step 265, the notification interface 110 determines whether the counter for the messaging application is equal to zero. If the counter is not equal to zero (e.g., one or more), the notification representations are displayed on the notification bar. However, once the counter is adjusted to zero, the number zero represents that there are no more notification representations that are generated and not dismissed. At step 270, the portion of the notification bar for the presenting the messaging application is removed or hidden.

Although the steps in FIG. 2 were described with reference to one particular exemplary application, the steps apply to a variety of different applications. The process can occur for individual applications concurrently so that the notification bar can present groups of notification representations for different applications. Examples of the notification bar are discussed with reference to FIGS. 4-6 below.

Hardware Diagram

Figure 3:
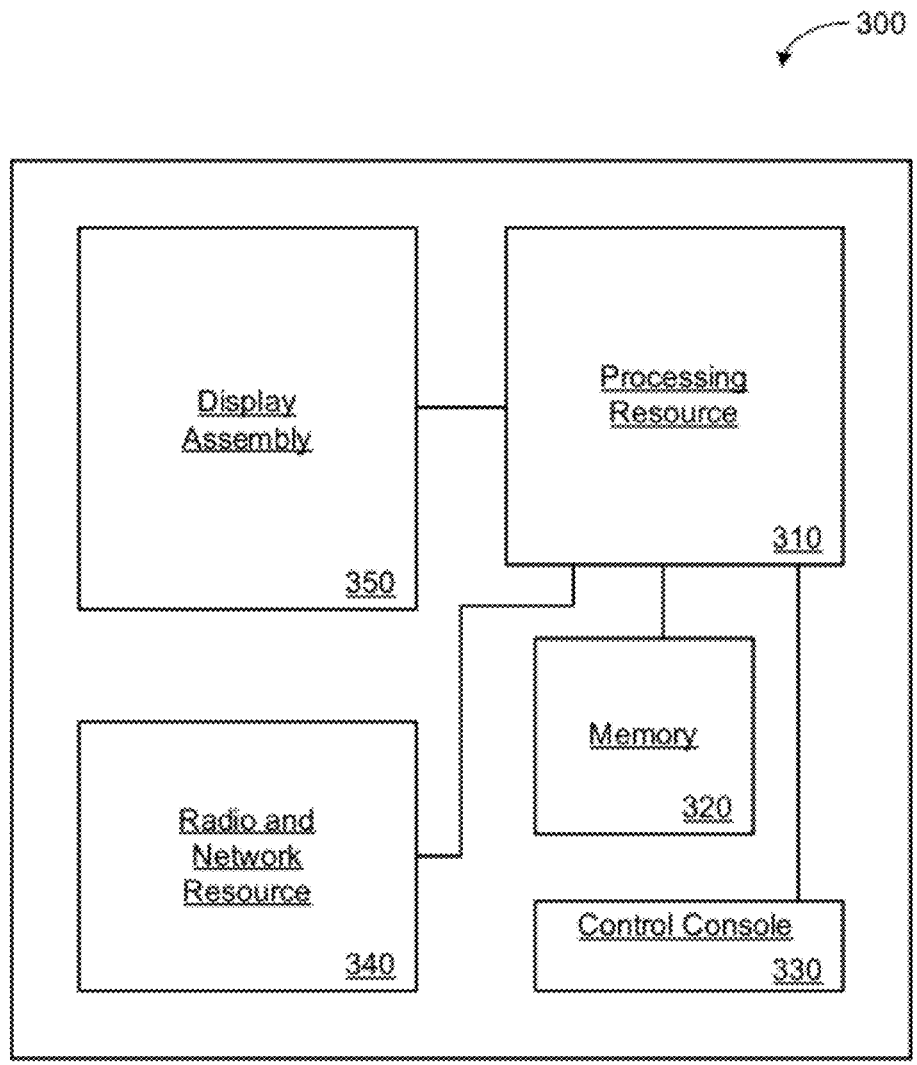
FIG. 3 is a block diagram of a mobile computing device under an embodiment.

FIG. 3 is a block diagram of a computing device for implementing an architecture such as described with FIG. 1, under an embodiment. In FIG. 3, a computing device 300 includes a processing resource 310, one or more memory 320 for storing applications, display features, and data used by the applications (e.g., Flash memory, RAM, hard drive, portable storage units, etc.), a control console 330 for enabling a user to control the device 300 with user inputs, a radio and network resource 340, and a display assembly 350. In some embodiments, the control console 330 can be incorporated or be a part of the display assembly 350.

The processing resource 310 is configured to execute instructions and process data for implementing the system 100 as described with FIG. 1, so that group notifications can be provided on the display assembly 350 of the computing device 300. The radio and network resource 340 enables network connectivity and/or cellular telephony capabilities. The radio and network resource 340 can be configured to enable network connectivity or connectivity with other devices through use of the Wi-Fi protocol (e.g., IEEE 802.11 (b) or (g) standards), Bluetooth protocol, etc.

In one or more embodiments, the display assembly 350 can include a touch screen display to enable a user to control the device 300 by making contact and movements on the touch screen display. The user selections or inputs referred to in FIGS. 1 and 2 can be performed on a touch screen display. Some user inputs can be a tap on a selectable feature on the user-interface, or other actions, such as a quick double tap or a gesture (e.g., a drag or swiping motion). As discussed, in some embodiments, to dismiss a notification representation on the notification bar, a user can simply tap the notification representation and swipe it away in one or more directions. The user can also dismiss a notification representation by opening the corresponding application and reading or viewing the record corresponding to the notification representation. The user can open the corresponding record by tapping on the notification representation.

Notification Bar

Figure 4:
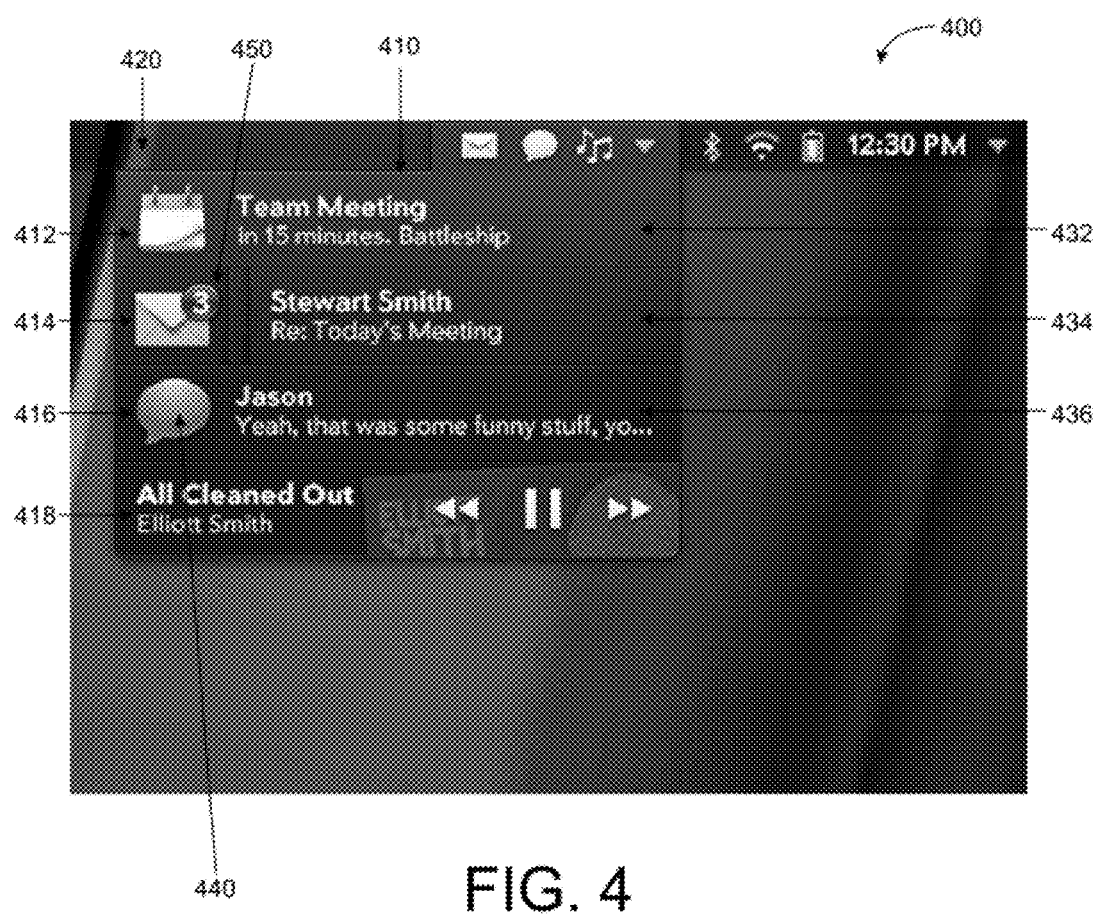
FIG. 4 illustrates a notification bar that is provided on a mobile computing device under an embodiment.
Figure 5:
FIG. 5 illustrates a notification bar that is provided on a mobile computing device under another embodiment.
Figure 6:
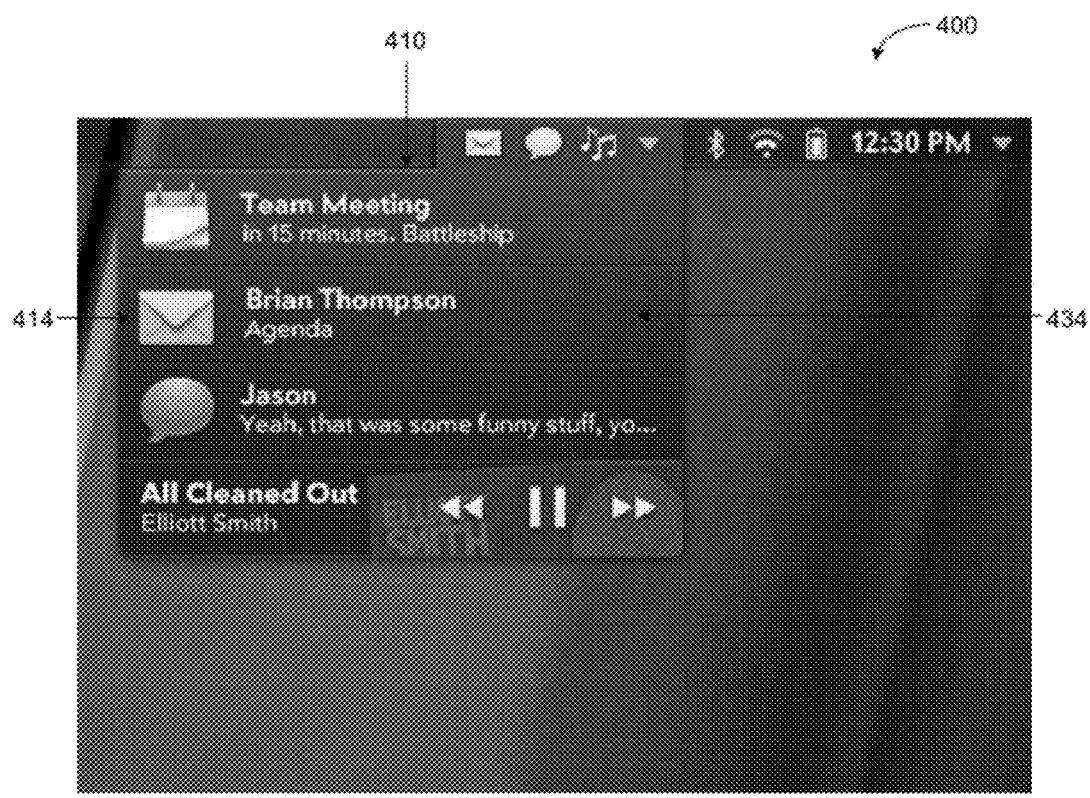
FIG. 6 illustrates another notification bar that is provided on a mobile computing device under an embodiment.

FIGS. 4-6 illustrate notification bars provided on a display under an embodiment. The illustrations described with FIGS. 4-6 may be implemented using, for example, elements shown and described with FIGS. 1-3. As such, reference to elements of FIGS. 1-3 is intended for illustration purposes.

FIG. 4 illustrates a notification bar that is provided on a computing device under an embodiment. The presentation 400 illustrates a portion of a home page display that can be rendered on a display of a computing device, such as a cell phone or a tablet device. The presentation 400 includes a notification bar 410 and a status bar 420. The notification bar is configured to present a plurality of notification representations that are generated in response to event occurrences. The notification bar 410 has four portions to display various notification representations corresponding to a variety of applications—a first portion 412, a second portion 414, a third portion 416 and a fourth portion 418.

In some embodiments, the notification bar 410 can present notification representations for a plurality of applications concurrently. The notification representations can be grouped in different portions of the notification bar 410 according to their corresponding applications. For example, in one embodiment, a notification representation 432 can be presented in a first portion 412 of the notification bar 410. The notification representation 432 can correspond to a notification from a calendar application of the computing device. The notification could be a reminder that a calendar event is scheduled to occur in fifteen minutes (or other predetermined or user-chosen time period).

Multiple notification representations 434 can also be presented in a portion of the notification bar 410. In some embodiments, the notification representations 434 are grouped together and configured as layers because there are more than one notification representation corresponding to the email application. More specifically, in one example, the second portion 414 has three layers of notification representations 434, with the top layer (e.g., an email from Stewart Smith being the most recently received email application notification) shown on top. Similarly, notification representation 436 is presented in the third portion 416 of the notification bar 410. Notification representation 436 corresponds to a notification from a text messaging application.

Each portion of the notification bar 410 also includes a graphic image 440 that represents one or more notification representations from a corresponding application. In the first portion 412, the graphic image 440 is of a calendar pad to represent the calendar application. The second portion 414 includes a graphic image 440 of an envelope, which represents the email application. The third portion 416 includes a graphic image 440 of a text bubble to represent the messaging application. Other portions may provide other graphic images to represent various other corresponding applications (e.g., an alarm clock image for set alarms, telephone image for missed calls, etc.).

In some embodiments, the notification bar 410 can also include a portion for providing controls for one or more media players (e.g., a media player for video playback, or a media player for audio playback). If a media player is currently being accessed or used by a user, the notification bar 410 may provide a portion for enabling the control of that media player. For example, in the presentation 400, the fourth portion 418 has a different type of graphic image to represent a song that is currently playing on the computing device (e.g., the partial graphic that shows "Elliot Smith" behind the rewind, fast forward and pause buttons). A user may perform an action on the notification bar 410 to access the controls of the media player (e.g., rewind, fast forward, pause) in order to control the media that is being played back.

Depending on the application, the content of the notification representations can vary. For example, in some embodiments, for a calendar notification, the name of the event ("Team Meeting") is provided with text describing the scheduled meeting time ("in 15 minutes") as well as the room or location ("Battleship"). For an email notification, the sender's name ("Stewart Smith") can be provided with a subject line ("Re: Today's Meeting") on the notification representation. For a text message, the sender's name (or phone number) can be provided with a portion of the content of the text message. In one or more embodiments, a user can change the settings on the computing device to program what items or text is shown or displayed on the notification representations.

According to some embodiments, for portions of the notification bar 410 that include multiple notification representations, a number is also provided that represents the total number of notification representations that have been generated by a corresponding application and not dismissed by a user. For example, in the second portion 414 of the notification bar 410, a number 450 is provided. The number "3" represents the number of email notifications that have been generated by the email application and not dismissed by the user. More specifically, three layers of notification representations 434 are provided, which match the number "3" presented in the second portion 414.

In one or more embodiments, multiple notification representations for a corresponding application can be grouped together and stacked as layers in a portion of the notification bar 410. For example, three email notification representations 434 are stacked so that at least some portions of the layers can be seen. A user can dismiss the notification representations by a user action or selection. In some embodiments, the user can hold and swipe/drag a layer in one or more directions to dismiss a notification representation without actually viewing or launching the corresponding application. The user can also read or view the record corresponding to the notification representation on the top layer by selecting the notification representation. Upon the user selection, the corresponding application with the specific record can be automatically launched or opened. For example, the user can dismiss the email notification representation 434 from Stewart Smith by selecting the notification representation 434 (which causes the email record from Stewart Smith to automatically open or launch with the email application) or by independently opening or launching the email application and reading or viewing the email record corresponding to the notification representation 434. The user may also dismiss the email notification 434 from Stewart Smith by making a swiping gesture in one or more directions. The user may then dismiss the next email notification and so on, until no email notifications are available. The portion 414 may then be hidden because email notifications are no longer present (e.g., the portions below will shift up).

In other embodiments, the user can dismiss the entire notification set of the application through a user action. For example, three email notification representations 434 are stacked so that at least some portions of the layers can be seen. The user can dismiss the entire grouped notification representations 434 corresponding to email application notifications by performing an action on the graphic image corresponding to the email application. Like dismissing one layer by making a swiping gesture in one or more directions, a user may also dismiss the entire grouped notification representations 434 by selecting and holding the graphic image of the envelope, and making a swiping gesture in one or more directions.

In one or more embodiments, the display of the computing device can be a touch screen display so that a user can provide input and/or selections by making contact with the touch screen display on various locations. The swiping gesture, for example, can be done by a user placing a finger on the notification representation 434, holding the finger and moving the finger in a swiping motion to the right. The notification representation 434 can also be selected to automatically view or read a record corresponding to the notification representation 434 by a quick tap on the notification representation 434 on the notification bar 410.

Once a notification of a plurality of grouped notifications are dismissed, the counter is adjusted and the number provided on the notification bar is decremented. For example, if the email from Stewart Smith is read or viewed by a user or if the user dismissed the email notification representation 434 through user action, the second portion 414 would have only two layers of notification representations 434. The number 450 would be decreased to "2" to represent the number of notification representations that have been generated by the email application and not dismissed. This can be seen in FIG. 5.

In FIG. 5, the number 450 representing the counter for the email application is adjusted to "2" because there are only two email notification representations that have been generated by the email application and not dismissed by a user. In one embodiment, because the more recent email notification representation has been dismissed, the second portion 414 of the notification bar 410 now provides the next most recent email notification representation 434 that is generated by the email application and not dismissed by the user (e.g., an email from GAP offering an advertisement or promotion for "30% Savings Today!"). The user can also dismiss this notification representation 434, as seen in FIG. 6. Once dismissed, in FIG. 6, there is only one email notification representation 434 provided in the second portion 414. A number representing the counter is not provided because there is only one email notification representation 434 presented in the notification bar 410.

In some embodiments, if the notification representations 434 are dismissed so that there are no notification representations left that correspond to the email application, the second portion 414 would be hidden and the other portions shifted up (so that only three portions are shown). If all the notification representations of all the applications are dismissed, then the notification bar 410 would be empty.

Referring back to FIG. 4, in some embodiments, the notification bar 410 can also include a portion for presenting applications that are currently being used. For example, the notification bar 410 includes a fourth portion 418 that presents a media application showing both the title of the song and the artist that is currently being played. For a media application, other selectable features may be provided (e.g., such as rewind, pause, or fast forward).

It is contemplated for embodiments described herein to extend to individual elements and concepts described herein, independently of other concepts, ideas or system, as well as for embodiments to include combinations of elements recited anywhere in this application. Although embodiments are described in detail herein with reference to the accompanying drawings, it is to be understood that the invention is not limited to those precise embodiments. As such, many modifications and variations will be apparent to practitioners skilled in this art. Accordingly, it is intended that the scope of the invention be defined by the following claims and their equivalents. Furthermore, it is contemplated that a particular feature described either individually or as part of an embodiment can be combined with other individually described features, or parts of other embodiments, even if the other features and embodiments make no mentioned of the particular feature. Thus, the absence of describing combinations should not preclude the inventor from claiming rights to such combinations.

What is claimed is:

1. A method for providing notifications on a mobile computing device, the method comprising:
    enabling multiple applications operating on the mobile computing device to generate notifications in response to application-specific event occurrences;
    presenting a plurality of notification representations in a status bar on a display, the plurality of notification representations being individually generated by a corresponding one of the multiple applications in response to an event occurrence;
    responding to user selection of the status bar by presenting a notification graphic including one or more notification representations generated by a first application from the multiple applications, the one or more notification representations being presented (i) in at least a first portion of the notification graphic, (ii) with a number that represents how many notification representations from the first application have been generated and not dismissed, and (iii) with content corresponding to one of the event occurrences associated with the first application;
    wherein the first portion of the notification graphic also includes a graphic image representing the first application.

2. The method of claim 1, further comprising adjusting the number in response to additional events occurring with the first application.

3. The method of claim 1, further comprising adjusting the number in response to user input or action that dismisses one or more of the notification representations corresponding to the first application.

4. The method of claim 3, wherein each of the one or more notification representations is represented as an individual layer, the individual layers being stacked on each other.

5. The method of claim 4, wherein a top layer of the stack of individual layers represents a most recent notification generated by the first application.

6. The method of claim 4, wherein the user input or action includes an input or action to (i) launch the first application to render one or more records corresponding to one or more of the one or more notification representations, or (ii) manually remove one or more of the individual layers through the user input or action.

7. The method of claim 6, wherein manually removing one or more of the individual layers includes making a swiping gesture in one or more directions.

8. The method of claim 7, wherein the display is a touch screen display and wherein the user input or action includes contact on the touch screen display by a user's touch.

9. The method of claim 1, wherein presenting the notification graphic further includes representing one or more notification representations generated by a second application (i) in at least a second portion of the notification graphic, (ii) with a number that represents how many notification representations from the second application have been generated and not dismissed, and (iii) with content corresponding to one or the event occurrences associated with the second application.

10. The method of claim 9, further comprising hiding the first portion of the notification graphic when the number that represents how many notification representations from the first application have been generated and not dismissed is equal to zero.

11. A system for providing notifications on a mobile computing device, the system comprising:
    one or more processors configured to:
        enable multiple applications operating on the mobile computing device to generate notifications in response to application-specific event occurrences; and
        present a plurality of notification representations in a status bar on a display, the plurality of notification representations being individually generated by a corresponding one of the multiple applications in response to an event occurrence;
        responding to a user selection of the status bar by presenting a notification graphic including one or more notification representations generated by a first application from the multiple applications, the one or more notification representatons being presented (i) in at least a first portion of the notification graphic, (ii) with a number that represents how many notification representations from the first application have been generated and not dismissed, and (iii) with content corresponding to one of the event occurrences associated with the first application;
        wherein the first portion of the notification graphic also includes a graphic image representing the first application.

12. The system of claim 11, wherein the one or more processors are further configured to adjust the number in response to additional events occurring with the first application.

13. The system of claim 11, wherein the one or more processors are further configured to adjust the number in response to user input or action that dismisses one or more of the one or more notification representations corresponding to the first application.

14. The system of claim 13, wherein each of the one or more notification representations is represented as an individual layer, the individual layers being stacked on each other.

15. The system of claim 14, wherein the user input or action includes an input or action to (i) launch the first application to render one or more records corresponding to one or more of the one or more notification representations, or (ii) manually remove one or more of the individual layers through the user input or action.

16. The system of claim 15, wherein manually removing one or more of the individual layers includes making a swiping gesture in one or more directions.

17. The system of claim 16, wherein the display is a touch screen display and wherein the user input or action includes contact on the touch screen display by a user's touch.

18. The system of claim 16, wherein the individual layers may be manually removed one at a time until no more layers are provided in the first portion of the notification graphic.

19. The system of claim 16, wherein all of the individual layers may be manually removed at one time by making the swiping gesture of the graphic image in one or more directions.

20. The system of Claim 11, wherein presenting the notification graphic includes representing one or more notification representations generated by a second application (i) in at least a second portion of the notification graphic, (ii) with a number that represents how many notification representations from the second application have been generated and not dismissed, and (iii) with content corresponding to one of the event occurrences associated with the second application.

* * * * *